United States Patent Office.

JOSEPH G. ROGERS, OF MADISON, INDIANA.

Letters Patent No. 103,661, dated May 31, 1870.

IMPROVEMENT IN COMPOSITION FOR PREVENTING INCRUSTATION IN STEAM-BOILERS.

The Schedule referred to in these Letters Patent and making part of the same

*To all whom it may concern:*

Be it known that I, JOSEPH G. ROGERS, of the city of Madison, county of Jefferson, State of Indiana, have invented a new, useful, and improved Composition of Ingredients for Dissolving, Removing, and Preventing Incrustation in Steam-Boilers or other vessels or machinery for evaporating or heating water for any purpose; and I do hereby declare that the following is a full and exact description of its manufacture, use, and operation.

My invention consists in the preparation of any carbonate or bicarbonate of a fixed alkali, and the compounding of the same with any aqueous substance or solution containing tannin, in the hereinafter described manner and proportions, to produce a uniform and permanent compound, and the use of the same to dissolve, remove, and prevent incrustation in steam-boilers or other vessels used for heating or evaporating water.

To enable others skilled in the art to make and use the same, I describe its manufacture, use, and operation fully and exactly, as follows:

I take, by weight, two parts (if crystallized, one if dry) of carbonate of soda, or other chemical combination of carbonic acid with a fixed alkali. If crystallized, I heat the salt until it melts, then continue the heating, with constant stirring, until the greater part of the water of crystallization has been evaporated, and only a moist granular mass remains. If dry, I powder the salt, dissolve it in sufficient water, then boil the solution, with constant stirring, until most of the water has evaporated, leaving a moist granular mass, as before.

The salt prepared in either of the above manners I thoroughly mix, by stirring, with one or two parts, by weight, of aqueous extract of oak-bark, or with other aqueous tannin-bearing substance or solution of similar consistency, in proportion varying according to the amount of tannin contained therein, until the mixture assumes the consistency of a thick paste. This, while still warm, I put into vessels, in which it is to be kept for use.

By the resumption of water in the recrystallization of the alkaline salt, the compound assumes a certain degree of hardness, which insures the permanent uniform mixture of the ingredients.

In order to apply my invention to the purpose of dissolving, removing, and preventing incrustation in steam-boilers or other vessels used to heat or evaporate water, I cause to be introduced into the boiler or other vessel used—so that it may be in solution in the boiling water—through the man-hole, safety-valve, pumps, heater, tank, or otherwise, once a week, or oftener if convenient, a portion of said compound, in solution or solid, in the ratio of one pound to five hundred barrels of water evaporated.

Its operation in dissolving, removing, and preventing scale is as follows:

The salts contained in natural waters used in making steam are precipitated on boiling, and subside in a heavy, dense layer, which is not disturbed by the currents of ebullition. This is consolidated and often fused by the heat of the boiler, and then becomes the scale or crust in question. When the aforesaid compound is in solution in the boiling water, its ingredients combine chemically with the salts of the water or react upon each other, producing a precipitate, having a loose, light form, which does not subside at all, but remains in suspension in the boiling currents, settling only in that part of the boiling apparatus where no current exists, as in the mud-receiver or similar receptacle, whence it may be blown out at intervals. In boiling vessels having no such attachment the precipitate continues to circulate with the currents until ebullition ceases, when it subsides in a loose layer, and may be readily washed out by a stream of water.

Pre-existing crusts are brought into solution by chemical combination with the constituents of the aforesaid compound, and then form a loose floating precipitate, which is removed after settling, as above described.

The advantages of this mode of preparing the composition of the alkaline carbonates and aqueous extract of a tannin-bearing substance, are chiefly these:

First, it is thereby produced in a solid, concentrated form, very convenient for keeping and using, since it may be formed in cakes or masses of desired size or weight, ready for use without further trouble.

Second, it preserves the ingredients in a homogeneous mixture more certainly, and for any length of time, without danger of separation or of losing its uniformity of proportion.

Third, it requires no useless foreign substances to bind the composition together.

I do not claim simply the use of the substances employed for this purpose; but

What I claim as my invention, and desire to secure by Letters Patent, is—

The composition of a carbonate of a fixed alkali and an aqueous extract of oak-bark or other tannin-bearing substance, when prepared by first nearly depriving the carbonate of its water of crystallization and then uniting it with the tannin extract, so as to solidify the mass, substantially as herein specified.

Witnesses:          JOSEPH G. ROGERS.
  OLIVER MULVEY,
  WM. H. ROGERS.